(12) United States Patent
Kim et al.

(10) Patent No.: US 12,722,445 B1
(45) Date of Patent: Sep. 1, 2026

(54) MULTI-STIFFNESS SUSPENSION APPARATUS

(71) Applicants: Hyundai Motor Company, Seoul (KR); Kia Corporation, Seoul (KR)

(72) Inventors: Eun Sik Kim, Hwaseong-si (KR); Jae Hun Kim, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 19/291,055

(22) Filed: Aug. 5, 2025

(30) Foreign Application Priority Data

May 7, 2025 (KR) ........................ 10-2025-0059264

(51) Int. Cl.
*B60G 21/055* (2006.01)
*B60G 21/00* (2006.01)
*B60G 21/02* (2006.01)

(52) U.S. Cl.
CPC ......... *B60G 21/055* (2013.01); *B60G 21/005* (2013.01); *B60G 21/026* (2013.01); *B60G 2202/135* (2013.01); *B60G 2206/427* (2013.01)

(58) Field of Classification Search
CPC .. B60G 21/055; B60G 21/005; B60G 21/026; B60G 2202/135; B60G 2206/427
See application file for complete search history.

(56) References Cited

U.S. PATENT DOCUMENTS 7,815,205 B2 * 10/2010 Barth ................. B60G 21/0558 280/124.107
10,118,457 B2 * 11/2018 Yang .................... B60G 21/055
10,987,990 B2 * 4/2021 Lim ................... B60G 21/0553
11,285,777 B2 * 3/2022 Lim ..................... B60G 21/106
11,731,481 B2 * 8/2023 Jang ..................... B60G 21/055 280/5.511
12,179,533 B1 * 12/2024 Kim ........................ F16F 1/145
12,344,058 B1 * 7/2025 Kim ....................... B60G 11/23

FOREIGN PATENT DOCUMENTS

KR 1019960021604 A 7/1996
KR 20070037079 A * 4/2007 ........... B60G 21/055
KR 20070114251 A 11/2007
KR 20080020176 A * 3/2008 ........... B60G 21/055
KR 20080020177 A * 3/2008 ................ F16F 1/04
KR 20100026767 A * 3/2010 ............... B60G 3/26
KR 102070384 B1 * 1/2020 ......... B60G 21/0553
KR 1020240066811 A 5/2024

OTHER PUBLICATIONS

KR-20070037079-A (machine translation) (Year: 2007).*
KR-20080020176-A (machine translation) (Year: 2008).*
KR-20080020177-A (machine translation) (Year: 2008).*
KR-20100026767-A (machine translation) (Year: 2010).*
KR-102070384-B1 (machine translation) (Year: 2020).*

* cited by examiner

*Primary Examiner* — Jason D Shanske
*Assistant Examiner* — Joselynn Y Sliteris
(74) *Attorney, Agent, or Firm* — Slater Matsil, LLP

(57) ABSTRACT

Disclosed is a multi-stiffness suspension apparatus including a first stabilizer bar connected to a wheel on a side of a vehicle, a second stabilizer bar connected to a wheel on the other side of the vehicle, the second stabilizer bar having an end disposed to face an end of the first stabilizer bar, and a plate spring provided between the facing ends of the first stabilizer bar and the second stabilizer bar.

20 Claims, 15 Drawing Sheets

MULTI-STIFFNESS SUSPENSION APPARATUS

CROSS-REFERENCE TO RELATED APPLICATIONS

This application claims priority from Korean Patent Application No. 10-2025-0059264, filed on May 7, 2025, in the Korean Intellectual Property Office, the disclosure of which is incorporated herein by reference in its entirety.

TECHNICAL FIELD

The present disclosure relates to a multi-stiffness suspension apparatus configured to add a spring to a stabilizer bar so as to provide multiple stiffnesses.

BACKGROUND

Generally, a vehicle rolls over when a vehicle body is tilted or shaken due to uneven road surfaces or inertia when the vehicle turns. To prevent a rollover accident of the vehicle, a suspension apparatus may be provided with a stabilizer bar to improve ride comfort and driving stability of the vehicle.

In the case of a stabilizer bar having uniform stiffness, it is difficult to flexibly respond to various driving conditions. To this end, an actuator may be provided on the stabilizer bar. However, when the actuator is added to the stabilizer bar, the structure of the stabilizer bar may become complicated, and the weight of the stabilizer bar may increase.

Therefore, the stabilizer bar needs to have a simple and lightweight structure and a multi-stiffness configuration.

The information included in this background of the present disclosure is only for enhancement of understanding of the general background of the present disclosure and may not be taken as an acknowledgement or any form of suggestion that this information forms the prior art already known to a person skilled in the art.

SUMMARY

The present disclosure has been made in view of the above problems, and it is an aspect of the present disclosure to provide a multi-stiffness suspension apparatus configured to add a spring to a stabilizer bar so as to provide multiple stiffnesses.

The aspects of the present disclosure are not limited to the above-mentioned aspects, and other technical aspects not mentioned herein will be clearly understood by those skilled in the art to which the present disclosure pertains from the detailed description of the embodiments.

In accordance with the present disclosure, the above and other aspects can be accomplished by the provision of a multi-stiffness suspension apparatus including a first stabilizer bar connected to a wheel on a side of a vehicle, a second stabilizer bar connected to a wheel on the other side of the vehicle, wherein the second stabilizer bar has an end disposed to face an end of the first stabilizer bar, and a clearance is formed between the first stabilizer bar and the second stabilizer bar in a rotation direction of the first stabilizer bar and the second stabilizer bar, and a plate spring provided between the facing ends of the first stabilizer bar and the second stabilizer bar, wherein a side of the plate spring is caught by the first stabilizer bar, the other side thereof is caught by the second stabilizer bar, and a hinge part is formed at a portion between the a side and the other side of the plate spring.

The first stabilizer bar may have a first locking part provided at the end thereof and formed to partially extend from the end, the second stabilizer bar may have a second locking part provided at the end thereof and formed to partially extend from the end, and the first locking part and the second locking part may be disposed to face and overlap each other in a width direction.

The first locking part may be formed by cutting a part of the first stabilizer bar, and the second locking part may be formed by cutting a part of the second stabilizer bar.

A sum of an outer circumference of the first locking part and an outer circumference of the second locking part may be formed to be smaller than an outer circumference of the first stabilizer bar or the second stabilizer bar.

An outer circumference of the first locking part may be formed to be equal to or less than ½ of an outer circumference of the first stabilizer bar, or an outer circumference of the second locking part may be formed to be equal to or less than ½ of an outer circumference of the second stabilizer bar.

The first locking part and the second locking part may be disposed spaced apart from each other so as to form the clearance between the first locking part and the second locking part.

The plate spring may extend in a direction crossing the end of the first stabilizer bar and the end of the second stabilizer bar and may be caught by the first stabilizer bar and the second stabilizer bar.

The plate spring may be bent along the hinge part in response that the first stabilizer bar and the second stabilizer bar are rotated relative to each other within a range of the clearance, and an angle formed between a portion of the plate spring, the portion extending from the hinge part toward the first stabilizer bar, and a portion of the plate spring, the portion extending from the hinge part toward the second stabilizer, may be changed.

The hinge part may be formed on a central axis of the first stabilizer bar or the second stabilizer bar.

The hinge part may be formed by reducing a thickness of a portion of the plate spring.

The hinge part may be a hinge groove formed by being recessed in a portion of the plate spring and extending in a longitudinal direction of the hinge part.

The plate spring may be formed such that a portion extending from the hinge part toward the first stabilizer bar side is shorter in length than a portion extending from the hinge part toward the second stabilizer side.

The plate spring may store elastic force through deformation of the hinge part during rotation of the first stabilizer bar or the second stabilizer bar.

The multi-stiffness suspension apparatus may further include a support part disposed to surround both the end of the first stabilizer bar and the end of the second stabilizer bar.

The support part may be formed to have a central axis identical to a central axis of the first stabilizer bar or the second stabilizer bar.

The support part may be moved relative to the first stabilizer bar and may be fixed to the second stabilizer bar, thereby enabling the first stabilizer bar and the second stabilizer bar to be rotated relative to each other inside the support part.

The support part may have an insertion hole formed therein and configured for the plate spring to be inserted thereinto, and the plate spring may be inserted into the insertion hole by penetrating the second stabilizer bar.

The first locking part may have a fixing groove formed therein and configured for the plate spring to be inserted thereinto, and the support part may have an insertion hole formed therein, such that the plate spring is inserted into both the fixing groove and the insertion hole, The support part may be formed to be longer than the plate spring, and the plate spring may be disposed inside the support part.

A widthwise length of the plate spring may be formed to be shorter than an outer diameter of the support part.

BRIEF DESCRIPTION OF THE DRAWINGS

The above and other aspects, features and other advantages of the present disclosure will be more clearly understood from the following detailed description taken in conjunction with the accompanying drawings, in which:

FIG. 2 is a perspective view of a first stabilizer bar in FIG. 1;

FIG. 5 is an enlarged perspective view of a portion of one side of the multi-stiffness suspension apparatus taken along line A-A in FIG. 1;

FIG. 7 is a cross-sectional view of the multi-stiffness suspension apparatus taken along line A-A in FIG. 1;

FIG. 13 is a perspective view of the support part;

DETAILED DESCRIPTION OF ILLUSTRATIVE EMBODIMENTS

Figure 1:
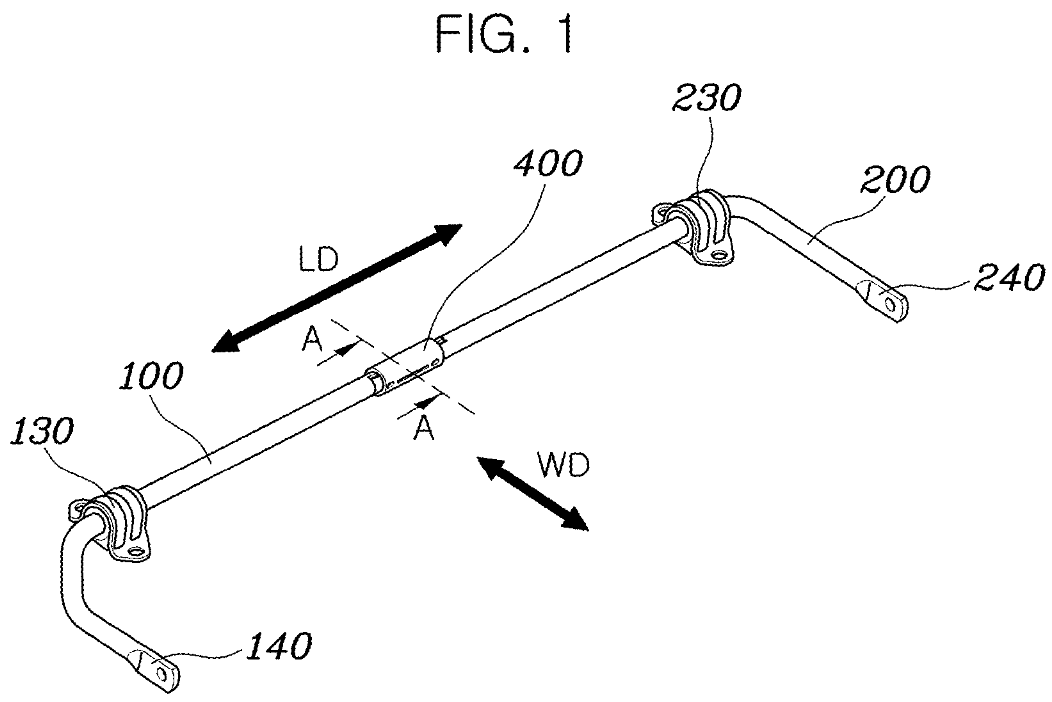
FIG. 1 is a perspective view of a multi-stiffness suspension apparatus according to an embodiment.

In describing the embodiments disclosed herein, when it is determined that a detailed description of publicly known techniques to which the disclosure pertains may obscure the gist of the present disclosure, the detailed description will be omitted. Further, it should be understood that the accompanying drawings are merely illustrated to easily describe embodiments disclosed in this specification, and therefore, the technical idea disclosed in this specification is not limited by the accompanying drawings. Further, it should be noted that the accompanying drawings include all modifications, equivalents, and substitutes that fall within the spirit and technical scope of the present disclosure. The disclosure below is not intended to limit the present disclosure to a form described in the present disclosure or to a specific field, and it is contemplated that various alternative aspects and modifications to the present disclosure are possible, whether explicitly described or implied herein. It will be appreciated by those skilled in the art to which the present disclosure pertains that the form and details of the present disclosure may vary.

The present disclosure will be described with reference to specific embodiments. However, as will be appreciated by those skilled in the art to which the present disclosure pertains, various embodiments disclosed herein may be modified or otherwise implemented in various other ways without departing from the spirit and scope of the disclosure. Accordingly, the following description is to be considered as illustrative and is for the purpose of teaching those skilled in the art the manner of making and using various embodiments. It is to be understood that the forms of disclosure herein shown and described are to be taken as representative embodiments. Equivalent elements, materials, processes, or steps may be substituted for those representatively illustrated and described herein. Expressions such as "including", "comprising", "incorporating", "consisting of", "have", and "is" used to describe and claim the present disclosure are intended to be construed in a non-exclusive manner, that is, to allow for items, components or elements not explicitly described herein to be present. Reference to the singular is also to be construed to relate to the plural.

Further, various embodiments disclosed herein are to be taken in the illustrative and explanatory sense and should not be construed as limiting the scope of the present disclosure. All references to joining (for example, attached, affixed, coupled, connected, and the like) are only used to aid the reader's understanding of the present disclosure and are not intended to limit the position, orientation, or use of a configuration and/or methods disclosed herein. Therefore, references to joining, if any, are to be construed broadly. Moreover, such references to joining do not necessarily imply that two or more elements are directly connected to each other. Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to any component, embodiment, variation, and/or modification, or the order or preference thereof. That is, while these expressions may be used to describe various components, the components are not limited by the corresponding expressions. These expressions are used only for the purpose of distinguishing one component from another.

Hereinafter, the suffixes "module", "unit", and "part" for components used in the following description are merely provided for facilitation of preparing this specification. Therefore, the suffixes themselves do not have significant meanings or roles.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that no other components are present therebetween.

In addition, "unit" or "control unit" is only a term widely used in naming a controller for controlling a specific function of the vehicle, and does not mean a generic functional unit.

Examples of the device may include a communication device configured to communicate with other controllers or sensors to control the corresponding function, a non-transitory computer-readable medium configured to store an operating system or logic commands and input/output information, and one or more processors configured to perform determination, calculation, communication, and the like necessary for controlling the corresponding function.

Any number or components or a variety of components in any of the configurations described herein may be included within the disclosure described herein. The components may include any combination of the features described herein and may be arranged in any of the various configurations described herein. The structure and arrangement of the components of the present disclosure, as well as the concepts regarding the use and operation thereof may be applied not only to the specific embodiments discussed herein, but also to any number of embodiments in any combination. Embodiments including those having various features in various arrangements will be described below with reference to the drawings.

Hereinafter, various embodiments disclosed herein will be described in detail with reference to accompanying drawings, and regardless of the drawing symbols, the same or similar components will be denoted by the same reference numerals, and redundant descriptions thereof will be omitted.

FIG. 1 is a perspective view of a multi-stiffness suspension apparatus according to an embodiment. Referring to FIG. 1, an overall configuration of the multi-stiffness suspension apparatus according to the embodiment will first be described. The multi-stiffness suspension apparatus includes a first stabilizer bar 100, a second stabilizer bar 200, a plate spring 300 (not shown), and may further include a support part 400.

Specifically, the multi-stiffness suspension apparatus includes the first stabilizer bar 100 connected to a wheel on one side of a vehicle, the second stabilizer bar 200 connected to a wheel on the other side of the vehicle and disposed such that an end of the second stabilizer bar 200 faces an end of the first stabilizer bar 100, wherein clearances 150 and 160 (as shown, for example, in FIG. 4) are formed between the first stabilizer bar 100 and the second stabilizer bar 200 in a rotation direction of the first stabilizer bar 100 and the second stabilizer bar 200, and the plate spring 300 (not shown) is provided between the facing ends of the first stabilizer bar 100 and the second stabilizer bar 200. One side of the plate spring 300 is caught by the first stabilizer bar 100, the other side thereof is caught by the second stabilizer bar 200, and a hinge part 310 (not shown) is formed at a portion between the one side of the plate spring 300 and the other side thereof.

The first stabilizer bar 100 or the second stabilizer bar 200 is twisted due to a compression difference between suspensions disposed on one side and the other side of the vehicle depending on the driving state of the vehicle. Here, each of the first stabilizer bar 100 and the second stabilizer bar 200 has torsional stiffness. Accordingly, each of the first stabilizer bar 100 and the second stabilizer bar 200 may generate restoring force to resist torsion and may return to the original shape thereof by the restoring force. Further, a displacement difference between the wheels on opposite sides may be suppressed by restoring force. As a result, it is possible to reduce roll of a vehicle body. To this end, the first stabilizer bar 100 and the second stabilizer bar 200 may be manufactured using a material such as carbon steel, alloy steel, stainless steel, aluminum alloy, nanocarbon, or a composite material of fiber and plastic. In particular, when carbon steel is used, the first stabilizer bar 100 and the second stabilizer bar 200 may have high tensile strength and fatigue strength so as to withstand repeated torsion, and stiffness and ductility thereof may be adjusted by thermal treatment so as to provide appropriate stiffness tuned for each vehicle. Further, since the cost of carbon steel is low and the processability thereof is excellent, carbon steel is suitable for mass production. In addition, the first stabilizer bar 100 and the second stabilizer bar 200 may be formed through manufacturing methods such as hot forging, cold drawing, cold forming, pipe bending, welding assembly, and composite stacking. In particular, when the first stabilizer bar 100 and the second stabilizer bar 200 are formed using hot forging and thermal treatment, internal defects thereof are reduced and microstructures thereof become dense, thereby improving durability and strength. Additionally, hardness and toughness may be adjusted to suit the conditions of use through thermal treatment, high production efficiency may be achieved, and uniformity of quality may be ensured during mass production. Of course, materials and manufacturing methods of the first and second stabilizer bars 100 and 200 are not limited thereto, and the first and second stabilizer bars 100 and 200 may be formed by other materials and manufacturing methods.

The first stabilizer bar 100 has a first connecting part 140 formed at one end thereof and connected to a wheel on one side of the vehicle. Further, the first stabilizer bar 100 has a first locking part 110 (as shown, for example, in FIG. 2) formed at the other end thereof and disposed to face the second stabilizer bar 200. A first bracket 130 supporting the first stabilizer bar 100 may be disposed at a portion between one end and the other end of the first stabilizer bar 100. The second stabilizer bar 200 has a second connecting part 240 formed at one end thereof and connected to a wheel on the other side of the vehicle. Further, the second stabilizer bar 200 has a second locking part 210 (as shown, for example, in FIG. 3) formed at the other end thereof and disposed to face the first stabilizer bar 100. A second bracket 230 supporting the second stabilizer bar 200 may be disposed at a portion between one end and the other end of the second stabilizer bar 200. The first bracket 130 and the second bracket 230 support rotation of each of the first and second stabilizer bars 100 and 200 and are fixed to a vehicle body. In this manner, movement of the wheels on opposite sides of the vehicle is suppressed by the first and second stabilizer bars 100 and 200. In addition, each of the first bracket 130 and the second bracket 230 may also play a role in absorbing or reducing road vibration and noise through a bushing and the like. Specifically, each of the brackets 130 and 230 may be formed of a body, a bushing, and a cover. Here, since each of the first and second stabilizer bars 100 and 200 is not a freely rotatable component, a bushing may be used instead of a bearing in each of the brackets 130 and 230. Through such a structural configuration, it is possible to obtain an effect of absorbing or reducing noise and vibration. The body and the cover of the bracket may be manufactured using carbon steel, high-tensile steel, aluminum alloy, stainless steel, and the like. Further, various manufacturing methods such as press forming, laser cutting, bending, welding assembly, casting, and mechanical processing may be used for formation of the body and the cover of the bracket. In particular, when high-tensile steel is used to manufacture the body and the cover of the bracket through press forming and bending, it is possible to achieve cost efficiency and improvement in strength and durability. As materials of the bushing included in each of the brackets 130 and 230, EPDM, NBR, NR, PU, and the like may be used to reduce vibration and impact, to provide flexible deformation and restoring force, and to achieve environmental resistance and durability.

Figure 2:
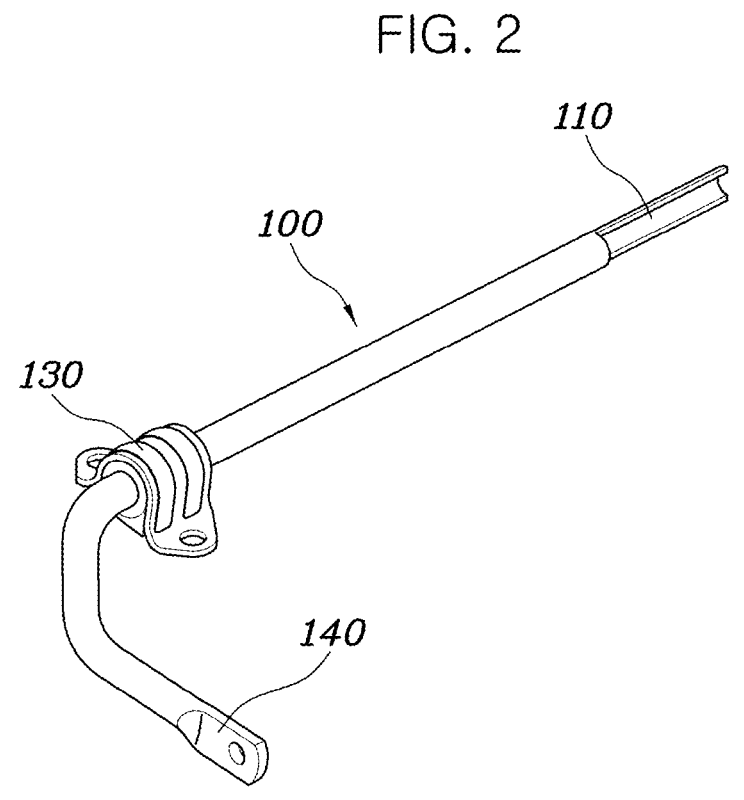
Figure 3:
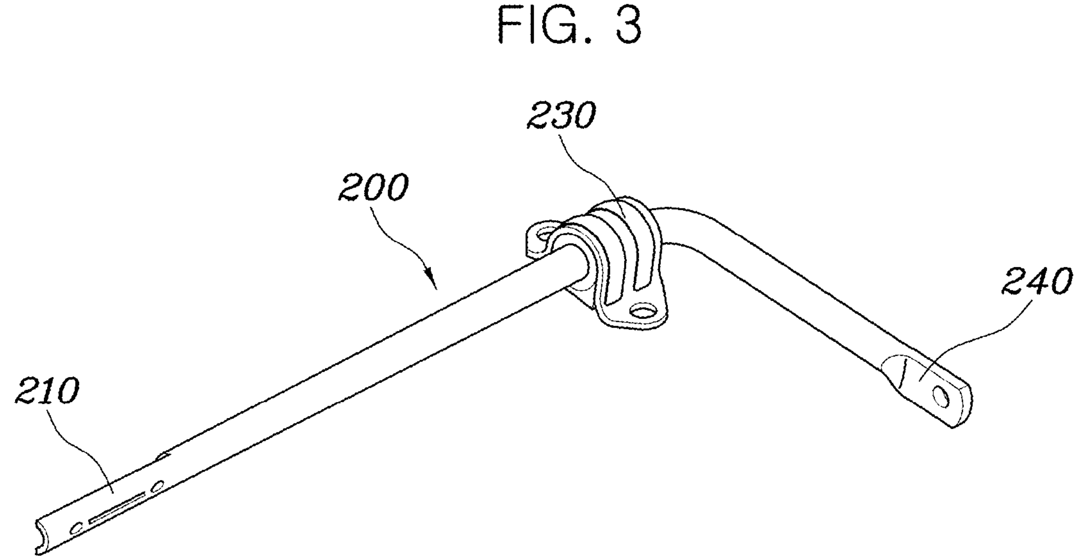
FIG. 3 is a perspective view of a second stabilizer bar in FIG. 1.
Figure 4:
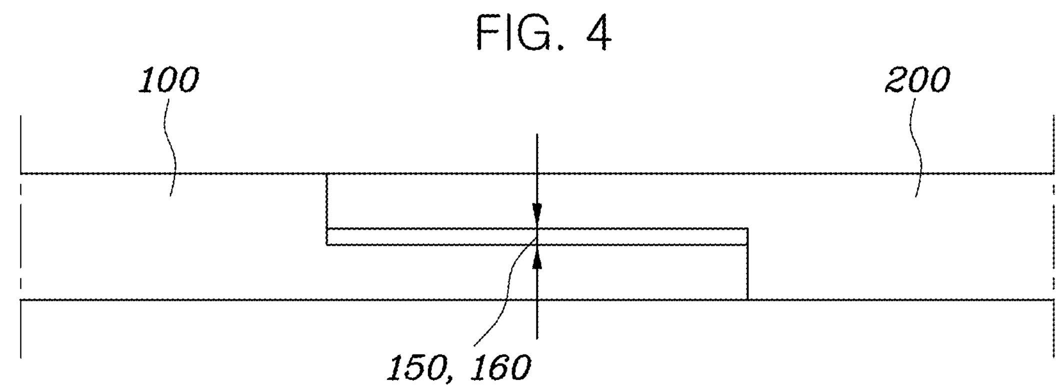
FIG. 4 is a plan view showing a state in which the first stabilizer bar and the second stabilizer bar are disposed to face each other.

FIGS. 2 to 4 are views showing the shape and arrangement relationship of the first stabilizer bar 100 and the second stabilizer bar 200. The shape and arrangement relationship of the first and second stabilizer bars 100 and 200 will be described with reference to FIGS. 2 to 4. The first stabilizer bar 100 has the first locking part 110 provided at the end thereof and formed to partially extend from the end, and the second stabilizer bar 200 has the second locking part 210 provided at the end thereof and formed to partially extend from the end. Here, the first locking part 110 and the second locking part 210 may be disposed to face each other and overlap each other in a width direction WD (shown in FIG. 1).

Specifically, the first locking part 110 may be formed by cutting a part of the end of the first stabilizer bar 100, and the second locking part 210 may be formed by cutting a part of the end of the second stabilizer bar 200. Each of the first and second stabilizer bars 100 and 200 may be formed to have a shape in which a circular cross-section extends. Accordingly, each of the locking parts 110 and 210 may be formed to have an extending arc shape in which a part of the circular cross-section is removed. The cut portions of the first locking part 110 and the second locking part 210 formed in this manner may be disposed to face each other. Through the above-described shape and arrangement, as shown in FIG. 4, clearances 150 and 160 are formed in a part of the bar having one circular cross-section extending in a longitudinal direction LD (shown in FIG. 1) overall, and the first stabilizer bar 100 and the second stabilizer bar 200 may be rotated relative to each other within the range of the clearances 150 and 160. Here, as described above, each of the first and second stabilizer bars 100 and 200 according to the embodiment is formed to have a pipe shape having a circular cross-section, but the present disclosure is not necessarily limited to the shape. Each of the first and second stabilizer bars 100 and 200 may be formed to have various cross-sectional shapes other than a circular cross-section, such as a polygonal shape, or may be formed in a shape having a cross-section extending in a curve.

The first stabilizer bar 100 and the second stabilizer bar 200 may have the same shape or may have a symmetrical structure, thereby improving stiffness, durability, and the like.

There are various methods of forming a clearance between the first and second stabilizer bars 100 and 200. For example, the sum of the outer circumferences of the first locking part 110 and the second locking part 210 may be formed to be smaller than the outer circumference of the first stabilizer bar 100 or the second stabilizer bar 200. For example, when the central axes of the first stabilizer bar 100 and the second stabilizer bar 200 are aligned with each other, the clearances 150 and 160 may be formed between the first locking part 110 and the second locking part 210.

For another example, the outer circumference of the first locking part 110 may be formed to be equal to or less than ½ of the outer circumference of the first stabilizer bar 100, or the outer circumference of the second locking part 210 may be formed to be equal to or less than ½ of the outer circumference of the second stabilizer bar 100. For example, as well, the clearances 150 and 160 may be formed between the locking parts 110 and 210.

That is, the first locking part 110 and the second locking part 210 may be disposed spaced apart from each other so as to form the clearances 150 and 160 therebetween. Here, in order to implement the above-described arrangement in the spaced state, the locking parts 110 and 210 need to be formed smaller than the first and second stabilizer bars 100 and 200 excluding the locking parts 110 and 210.

In this manner, the clearances 150 and 160 may be formed, and the first and second stabilizer bars 100 and 200 may be rotated relative to each other within the range of the clearances 150 and 160.

Further, in addition to the above-described arrangement, the first and second stabilizer bars 100 and 200 may be rotated relative to each other through other methods. For example, in a case where the first locking part 110 is formed inside the first stabilizer bar 100 and the second locking part 210 formed in the second stabilizer bar 200 is disposed adjacent to the first locking part 110, the second locking part 210 may be caught by the first locking part 110 when the second locking part 210 is rotated. Similarly, in a case where the second locking part 210 is formed inside the second stabilizer bar 200 and the first locking part 110 formed in the first stabilizer bar 100 is disposed adjacent to the second locking part 210, the first locking part 110 may be caught by the second locking part 210 when the first locking part 110 is rotated. As described above, relative rotation between the first and second stabilizer bars 100 and 200 may be realized using various methods.

In this manner, in the range in which the first and second stabilizer bars 100 and 200 are rotated relative to each other, the first and second stabilizer bars 100 and 200 are not twisted, and thus there is no torsional stiffness. Therefore, the plate spring 300 (not shown) is disposed to reinforce torsional stiffness.

The plate spring 300 (as shown, for example, in FIG. 5 and FIG. 12) may be manufactured using materials such as carbon steel, alloy steel, boron steel, stainless steel, fiber-reinforced composite materials, and non-ferrous metals and may be formed through manufacturing methods such as hot rolling, cold forming, surface shot peening, thermal treatment, stacking of composite materials, laser cutting, and bending. In particular, chrome vanadium-based alloy steel has excellent performances such as high elasticity, high fatigue strength, wear resistance, and processability, and has an effect of significantly improving fatigue life while maintaining high strength through processes such as hot forming, quenching, and shot peening. In addition, the plate spring 300 may be optimized by selecting appropriate materials and manufacturing methods in response to the required stiffness in the multi-stiffness suspension apparatus.

Figure 5:
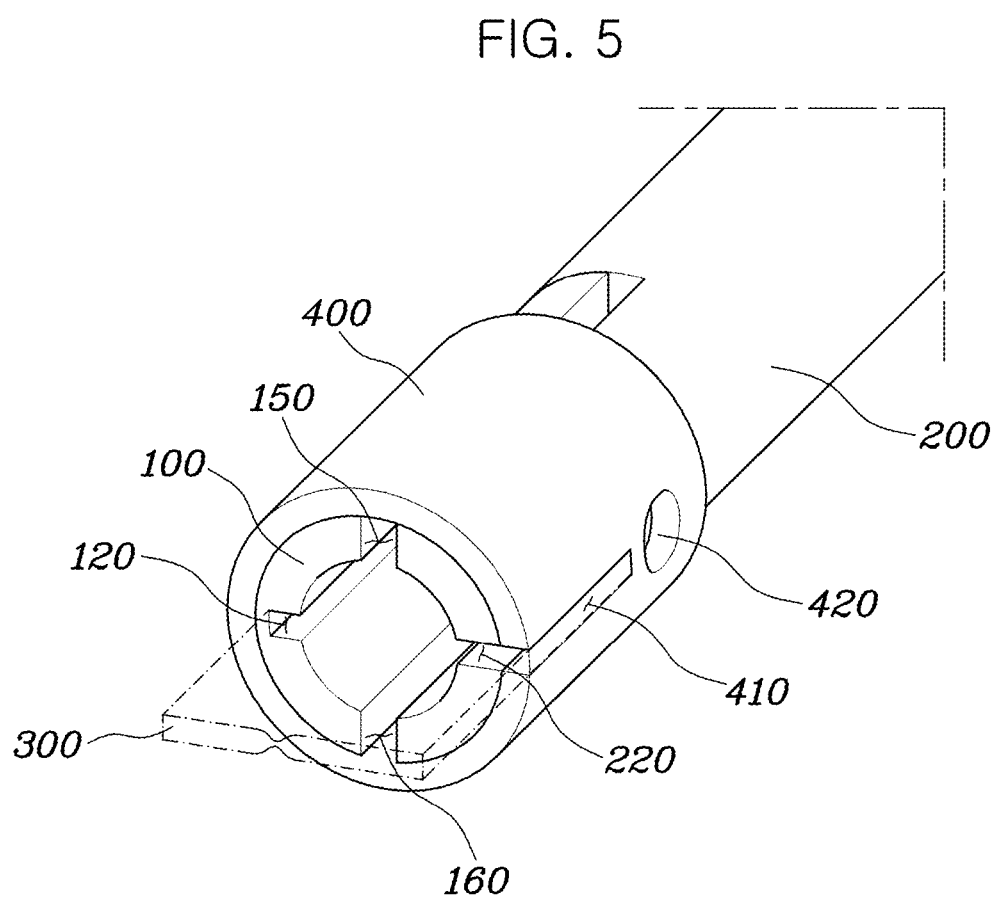
Figure 6:
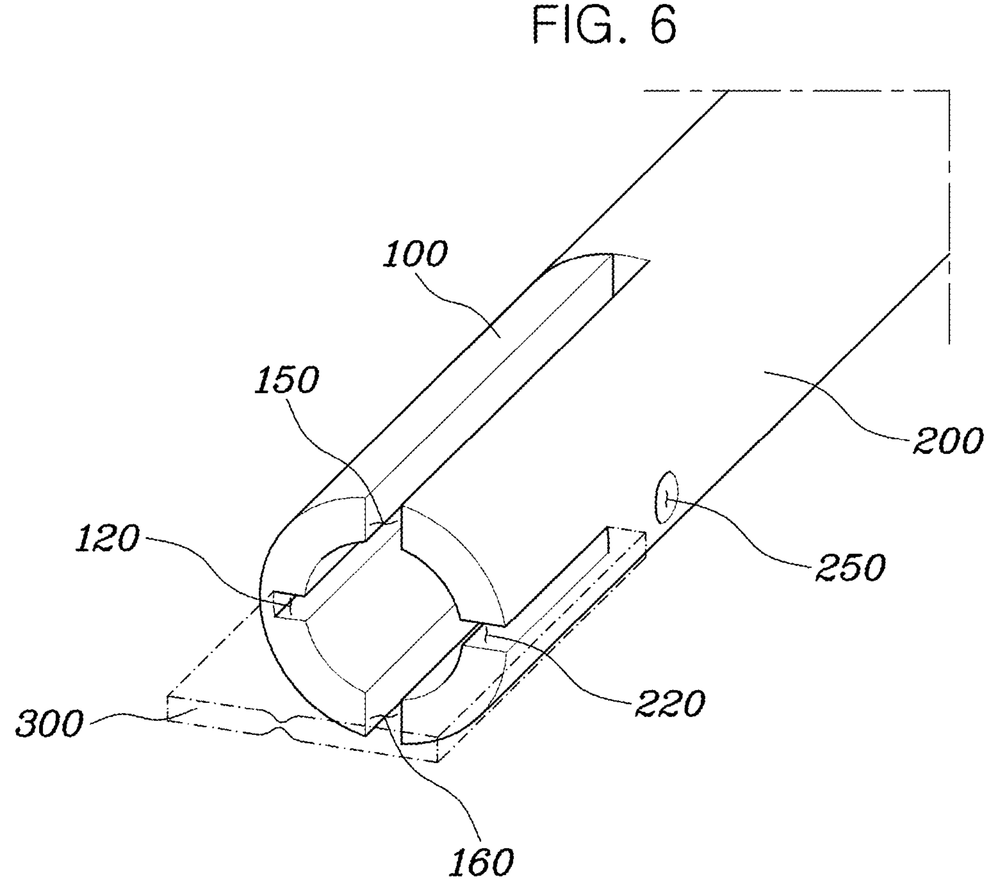
FIG. 6 is a perspective view showing a state in which a support part is removed from the multi-stiffness suspension apparatus in FIG. 5.
Figure 7:
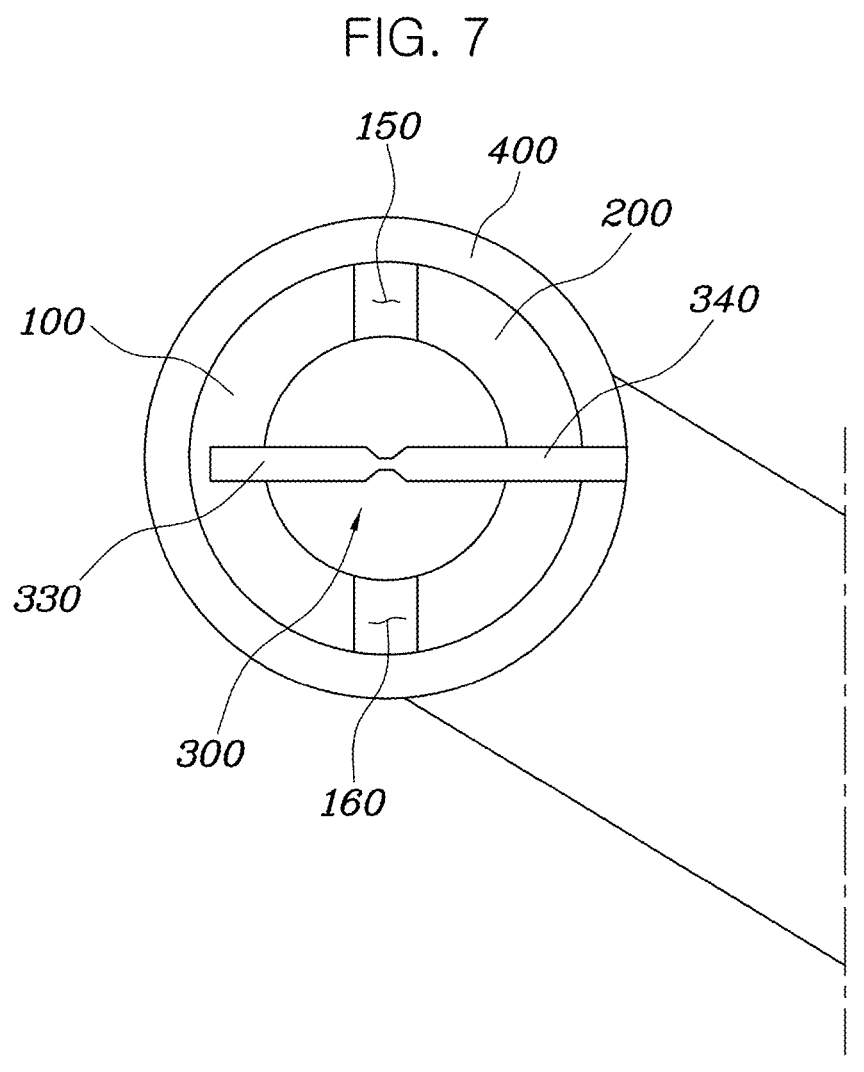
Figure 12:
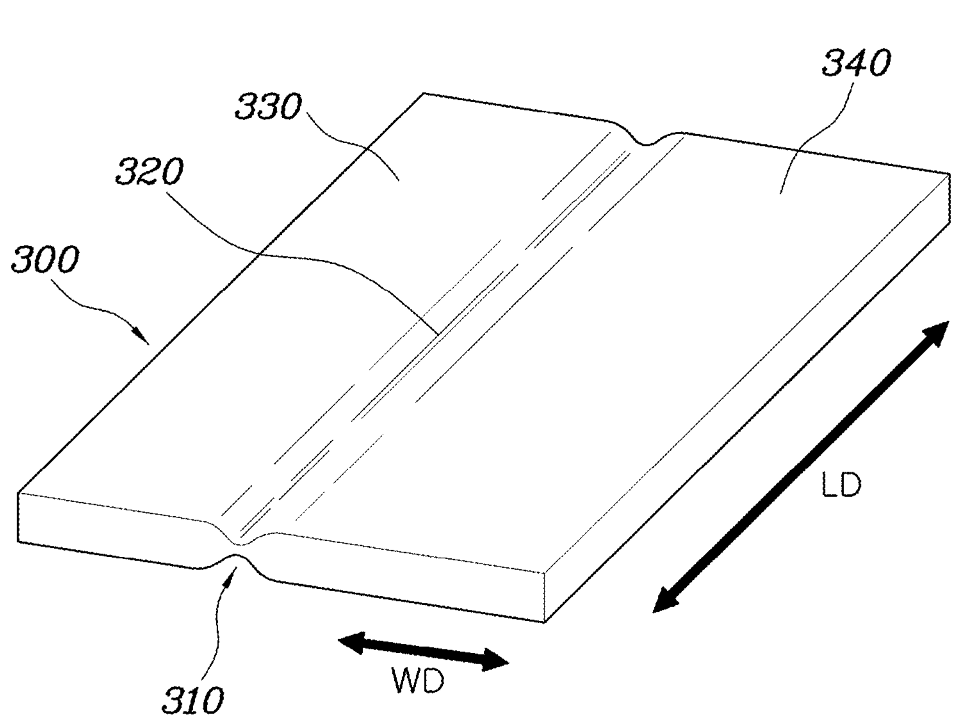
FIG. 12 is a perspective view of a plate spring.

FIGS. 5 to 7 are views showing the plate spring 300 disposed on the first and second stabilizer bars 100 and 200, and FIG. 12 is a perspective view of the plate spring 300. The shape and arrangement of the plate spring 300 will be described with reference to FIGS. 5 to 7. The plate spring 300 extends in a direction crossing the end of the first stabilizer bar 100 and the end of the second stabilizer bar 200, and both sides thereof are caught by the first stabilizer bar 100 and the second stabilizer bar 200, respectively. Through a structural configuration in which the plate spring 300 is simultaneously caused by the first stabilizer bar 100 and the second stabilizer bar 200, when the first stabilizer bar 100 and the second stabilizer bar 200 are rotated relative to each other, the plate spring 300 is deformed to generate and store elastic force. Accordingly, in a section (a clearance section) where the first and second stabilizer bars 100 and 200 are rotated relative to each other, the multi-stiffness suspension apparatus may have stiffness capable of resisting deformation according to stiffness of the plate spring 300. That is, when displacement occurs in any one of the two wheels, the first and second stabilizer bars 100 and 200 are rotated relative to each other in the clearances 150 and 160 between the first and second stabilizer bars 100 and 200, and simultaneously restoring stiffness according to elasticity of the plate spring 300 is primarily applied to the wheel. Further, when the locking parts 110 and 210 of the first and second stabilizer bars 100 and 200 mutually contact each other, deformation of the plate spring can no longer proceed, and the first and second stabilizer bars 100 and 200 are twisted together in one direction. For example, torsional stiffness by the first and second stabilizer bars 100 and 200 is secondarily applied to the wheel. When elastic force of the plate spring 300 is less than torsional stiffness of the first and second stabilizer bars 100 and 200, relative displacement between a vehicle body and a wheel is prevented by small elastic force in the case of residual vibrations or small uneven sections, thereby allowing a certain degree of relative movement between the vehicle body and the wheel. In this manner, it is possible to provide excellent ride comfort. In the case of the above-described small displacement, the probability of occurrence of vehicle rollover is low, and ride comfort of a vehicle may be improved. Meanwhile, in the case of sections such as a large uneven section and a cornering section where significant relative displacement occurs between a vehicle body and a wheel, it is required to increase restoring force between the vehicle body and the wheel through high torsional stiffness. Accordingly, roll of a vehicle body may be significantly reduced, thereby enhancing stability of vehicle movement. Therefore, in the case of the first and second stabilizer bars 100 and 200 of the present disclosure, it is possible to secure ride comfort, grip force, and movement stability of the vehicle depending on circumstances.

There are various examples in which the plate spring 300 is deformed when the first and second stabilizer bars 100 and 200 are rotated relative to each other. Referring to FIG. 12, for example, when the first and second stabilizer bars 100 and 200 are rotated relative to each other, the plate spring 300 is bent along the hinge part 310, and an angle between a first plate member 330, which is a portion extending from the hinge part 310 toward the first stabilizer bar 100, and a second plate member 340, which is a portion extending from the hinge part 310 toward the second stabilizer bar 200, is changed.

For another example, the plate spring 300 may be fully bent in a curved shape. For still another example, as one side and the other side of the plate spring 300 come closer to each other, the plate spring 300 may be compressed in the width direction WD. As described above, the plate spring 300 may be deformed in various manners, and thus, elastic force is generated to resist deformation.

However, the plate spring 300 needs to have constant stiffness so as to maintain constant control of the vehicle. To this end, the hinge part 310 is formed in the plate spring 300. The hinge part 310 may be formed on the central axis of the first stabilizer bar 100 or the second stabilizer bar 200. In this manner, the hinge part 310 is formed on the central axis of the first stabilizer bar 100 or the second stabilizer bar 200 such that the central axis of relative rotation of the first and second stabilizer bars 100 and 200 coincides with the hinge part 310, and thus, deformation may be induced in the hinge part 310 during the relative rotation. In addition, the plate spring 300 may be divided into the first plate member 330 and the second plate member 340 with respect to the hinge part 310, and a length in the width direction WD of the first plate member 330 may be formed to be shorter than a length in the width direction WD of the second plate member 340. Through such a structural configuration, even if the first plate member 330 is caught only by the first stabilizer bar 100 and the second plate member 340 is simultaneously inserted into the second stabilizer bar 200 and the support part 400, the hinge part 310 may coincide with the central axes of the first and second stabilizer bars 100 and 200.

That is, the plate spring 300 is deformed only at the hinge part 310, thereby making it easier to perform overall control of a suspension apparatus. A suspension apparatus of a vehicle often uses electronic control, and steering control may also be performed electronically. In such electronic control of a vehicle, since a certain variable needs to be secured to obtain control stability, elastic force generated by the plate spring 300 needs to be within a predictable range. Therefore, as in the present disclosure, it is possible to easily and accurately predict the magnitude of generated elastic force by allowing the plate spring 300 to be bent only at the same point, and such a structural configuration may be applied to the design or control of a vehicle, thereby securing reliability of vehicle control.

Meanwhile, there are various examples of inducing deformation of the hinge part 310. For example, in order to induce deformation of the hinge part 310, the hinge part 310 may be formed by reducing a thickness of a certain portion of the plate spring 300. That is, the thickness of the hinge part 310 may be formed to be smaller than the thickness of the plate spring 300 excluding the hinge part 310, thereby inducing deformation in the hinge part 310.

For another example, the hinge part 310 may be a hinge groove 320 formed to be recessed in a certain portion of the plate spring 300 and extend in the longitudinal direction LD. Similarly, since the hinge groove 320 is formed by being recessed in a part of the plate spring 300, deformation in the hinge groove 320 may be induced.

In summary, the first stabilizer bar 100 and the second stabilizer bar 200 may be rotated relative to each other, and the plate spring 300 disposed between the first and second stabilizer bars 100 and 200 may be deformed during the relative rotation. Additionally, the first stabilizer bar 100 and the second stabilizer bar 200 also have torsional stiffness. In conclusion, the first and second stabilizer bars 100 and 200 and the plate spring 300 among the components of the multi-stiffness suspension apparatus may have structural stiffness so as to resist deformation. FIGS. 8 to 11 are views each showing a process in which the multi-stiffness suspension apparatus according to the embodiment is subjected to torsion. Referring to FIGS. 8 to 11, a description will be given as to how the multi-stiffness suspension apparatus according to the embodiment has various stiffnesses when subjected to torsion.

Figure 8:
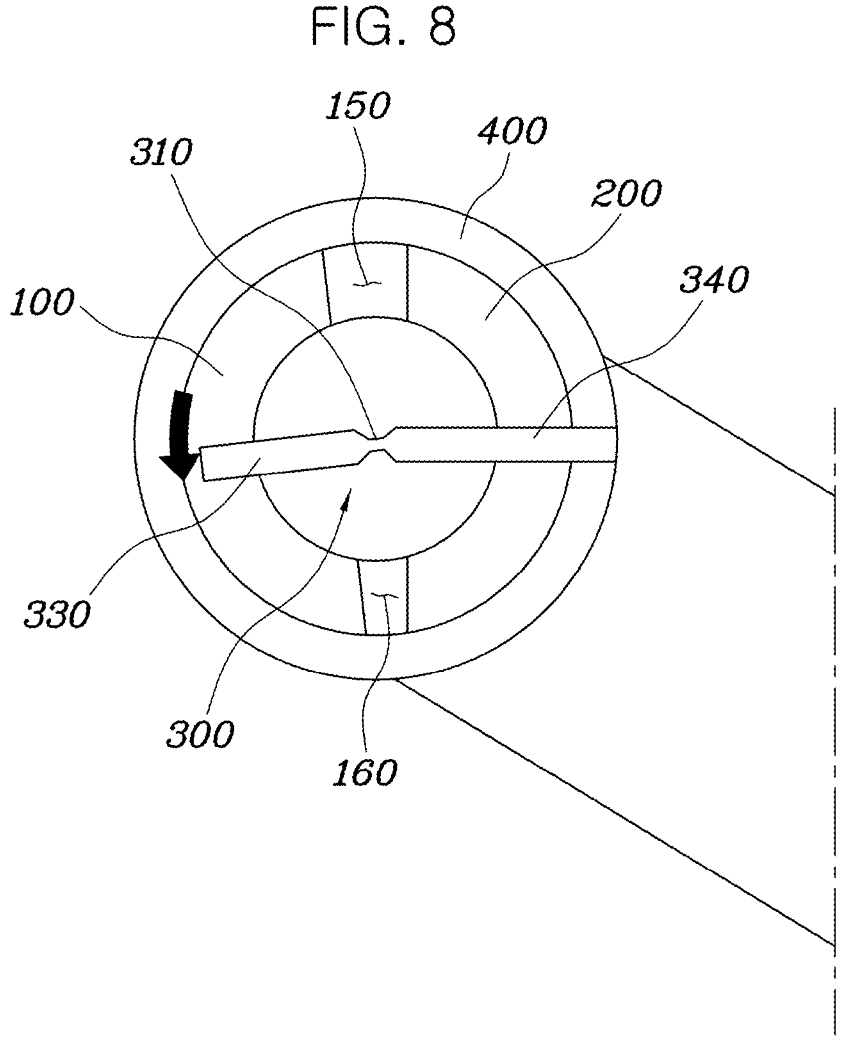
FIG. 8 is a cross-sectional view of the multi-stiffness suspension apparatus taken along line A-A in FIG. 1 in a state in which the first stabilizer bar and the second stabilizer bar are rotated within a range of a clearance.
Figure 9:
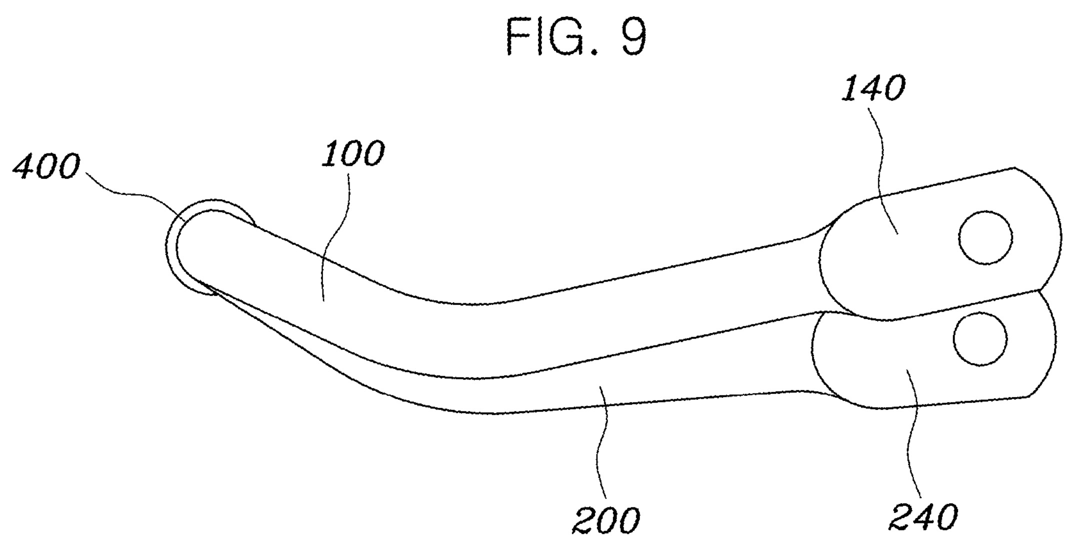
FIG. 9 is a side view showing the state in which the first stabilizer bar and the second stabilizer bar are rotated within the range of the clearance in FIG. 1.

As described above in FIG. 7, the plate spring 300 is disposed to cross the end of the first stabilizer bar 100 and the end of the second stabilizer bar 200. Here, one side of the plate spring 300 is connected to the first stabilizer bar 100, and the other side thereof is connected to the second stabilizer bar 200. For example, as shown in FIG. 9, when viewed from the side, a height of the first connecting part 140 connected to one wheel of the vehicle and a height of the second connecting part 240 connected to the other wheel of the vehicle are formed to be different depending on the driving state of the vehicle, causing the multi-stiffness suspension apparatus to be twisted. Specifically, since the first stabilizer bar 100 and the second stabilizer bar 200 are rotated relative to each other within the range of the clearances 150 and 160, the second clearance 160 formed in a direction in which the end of the first stabilizer bar 100 and the end of the second stabilizer bar 200 approach each other still remains. That is, the end of the first stabilizer bar 100 and the end of the second stabilizer bar 200 are maintained without contacting each other. Accordingly, as shown in FIG. 8, the plate spring 300 is deformed, and the deformed plate spring 300 stores elastic force to resist deformation. Here, when external force or external environment applied to the vehicle wheel is removed, the wheel is restored to the original position thereof. For example, it is understood that displacement between the vehicle body and the wheel is restored. In this manner, the multi-stiffness suspension apparatus has a first stiffness by the plate spring 300.

Figure 10:
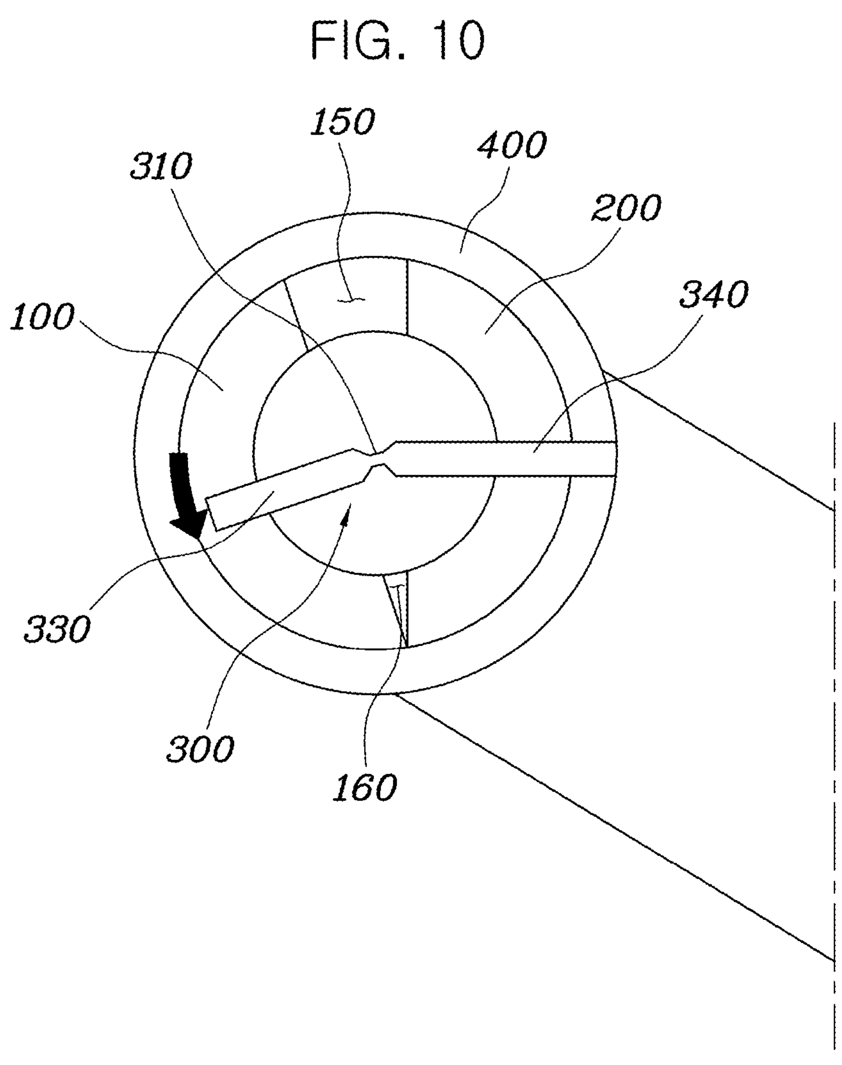
FIG. 10 is a cross-sectional view of the multi-stiffness suspension apparatus taken along line A-A in FIG. 1 in a state in which the first stabilizer bar and the second stabilizer bar are rotated beyond the range of the clearance.
Figure 11:
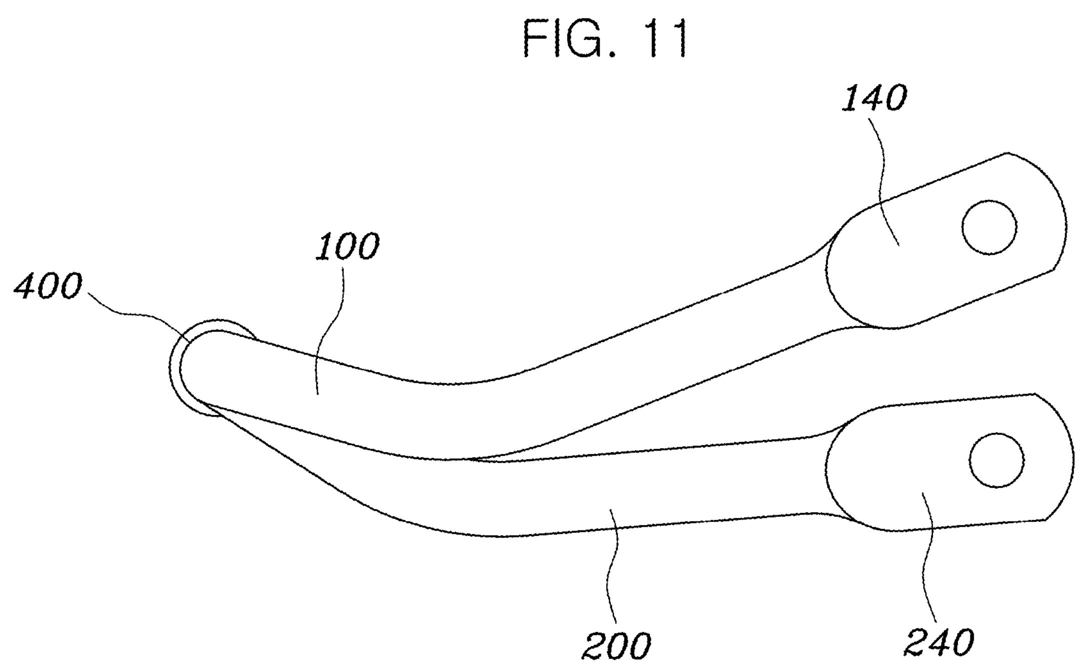
FIG. 11 is a side view showing the state in which the first stabilizer bar and the second stabilizer bar are rotated beyond the range of the clearance in FIG. 1.

As shown in FIG. 11, when deformation occurs so as to cause a larger height difference between the first connecting part 140 and the second connecting part 240, the end of the first stabilizer bar 100 and the end of the second stabilizer bar 200 come into contact with each other, and most of the second clearance 160 disappears, as shown in FIG. 10. Subsequently, when deformation continuously occurs, torsion occurs in the first stabilizer bar 100 and the second stabilizer bar 200. Therefore, elastic force is stored in torsional stiffness of the first and second stabilizer bars 100 and 200, and simultaneously, elastic force due to deformation is stored in the plate spring 300, thereby resisting torsion through the above-mentioned elastic forces. That is, when the first and second stabilizer bars 100 and 200 are deformed beyond the range of the clearances 150 and 160, a second stiffness is generated by combining the stiffness of the first and second stabilizer bars 100 and 200 and the stiffness of the plate spring 300.

In this manner, the multi-stiffness suspension apparatus according to the embodiment has two types of stiffness. Here, stiffness of the plate spring 300 and stiffness of the first stabilizer bar 100 or the second stabilizer bar 200 may be adjusted to set overall stiffness of the suspension apparatus. Accordingly, in a driving environment in which small deformation occurs, it is possible to smoothly respond to the small deformation using the first stiffness. Conversely, in a driving environment in which large deformation occurs, it is possible to strongly respond to the large deformation using the second stiffness, thereby preventing a vehicle from rolling over.

The multi-stiffness suspension apparatus according to the embodiment has been described as employing two types of stiffness, but the present disclosure is not necessarily limited thereto. The multi-stiffness suspension apparatus may have various types of stiffness or varying stiffness depending on the type, number, and arrangement of springs, the number and shape of divided stabilizers, and the like.

According to the embodiment, as described above, in the multi-stiffness suspension apparatus, the first stabilizer bar 100 and the second stabilizer bar 200 are disposed to have the clearances 150 and 160. Here, the multi-stiffness suspension apparatus has the first stiffness when the first stabilizer bar 100 and the second stabilizer bar 200 are rotated relative to each other within the range of the clearances 150 and 160. Additionally, when the first stabilizer bar 100 and the second stabilizer bar 200 are rotated relative to each other beyond the range of the clearances 150 and 160, the first stabilizer bar 100 and the second stabilizer bar 200 come into contact with each other and resist torsion, thereby obtaining the second stiffness. Since it is important to allow the first stabilizer bar 100 and the second stabilizer bar 200 to be rotated relative to each other in this manner, the multi-stiffness suspension apparatus according to the embodiment may include the support part 400 adapted to stably maintain the position of each component.

The support part 400 may be manufactured using the same material as the first and second stabilizer bars 100 and 200 or using a different material. When the support part 400 is manufactured using the same material as the first and second stabilizer bars 100 and 200, the coefficient of thermal expansion depending on a temperature change is the same, thereby maximally reducing a gap change when the temperature changes and preventing clearance or interference. Further, for example, since strength, elastic modulus, and fatigue characteristics are similar, stress concentration is reduced, thereby enabling uniform load distribution, improving durability, and improving efficiency of torsion transmission. In addition, high stability may be achieved even if a joining process such as welding or hot press-fitting is required, and manufacturing time and cost may be reduced by using the same thermal treatment or shot peening process. In contrast, when the support part 400 is manufactured using a material different from that of the first and second stabilizer bars 100 and 200, the support part has different stiffness from that of the first and second stabilizer bars 100 and 200, thereby obtaining another type of stiffness through combination between the first and second stabilizer bars 100 and 200 and the support part 400. That is, stiffness of the multi-stiffness suspension apparatus may be set in various ways.

Figure 13:
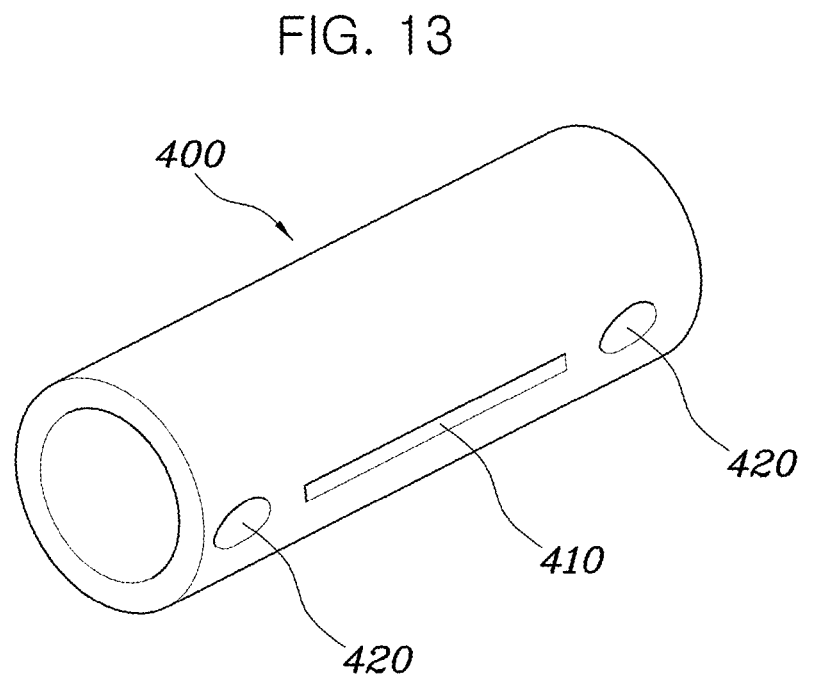
Figure 14:
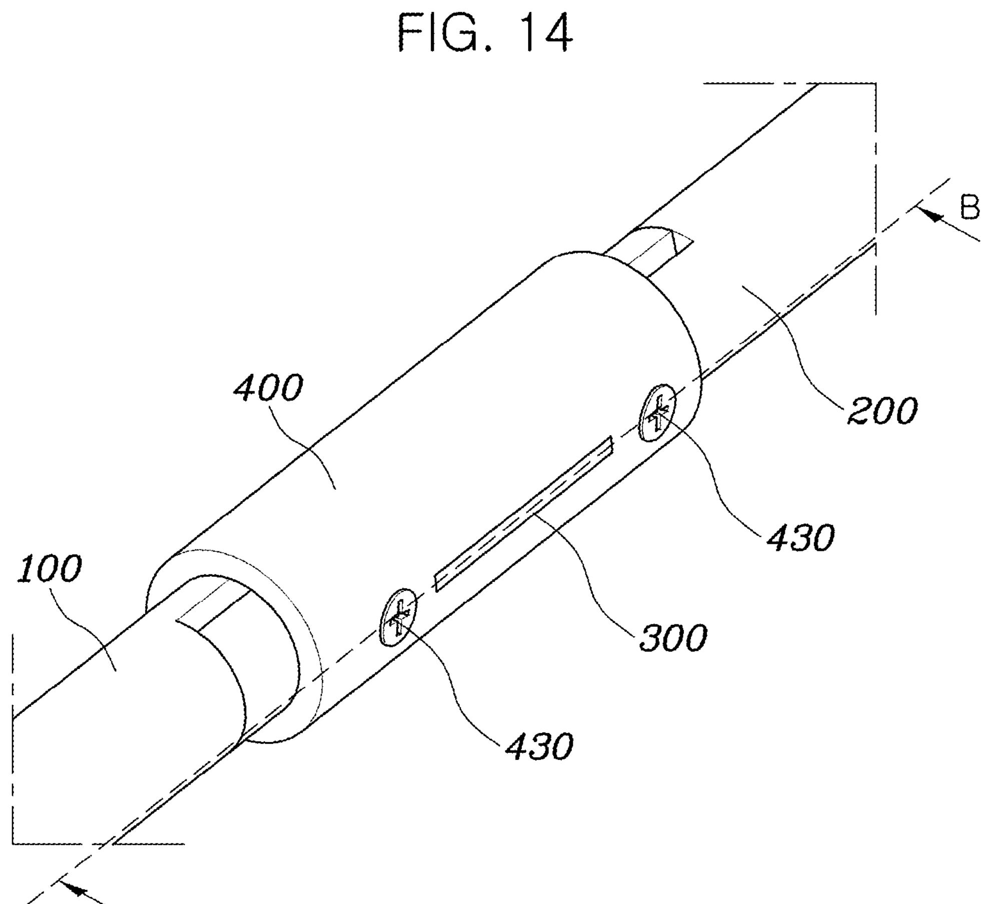
FIG. 14 is an enlarged perspective view of a portion on which the support part is disposed.
Figure 15:
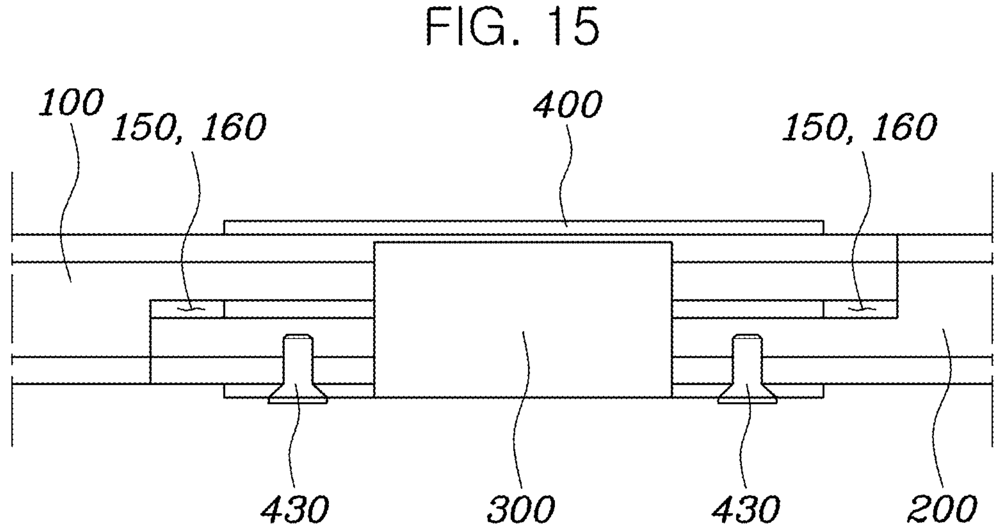
FIG. 15 is a cross-sectional view of the multi-stiffness suspension apparatus taken along line B-B in FIG. 14.

FIGS. 13 to 15 are views each showing the shape and arrangement of the support part 400. The shape and arrangement or connection relationship of the support part will be described with reference to FIGS. 13 to 15. The support part 400 may be disposed at a position allowing the support part to surround both the end of the first stabilizer bar 100 and the end of the second stabilizer bar 200. Specifically, the outer surfaces of the first locking part 110 and the second locking part 210 may be adjacent to and surrounded by the inner surface of the support part 400 at a position where the first locking part 110 and the second locking part 210 are disposed to face each other. Since the support part 400 surrounds the locking parts 110 and 210, movement of the locking parts 110 and 210 in the width direction WD is restricted.

The support part 400 may be formed such that the central axis of the support part 400 is the same as the center axis of the first stabilizer bar 100 or the second stabilizer bar 200. When the central axes of the support part 400 and the first stabilizer bar 100 or the second stabilizer bar 200 are the same, eccentric rotation is prevented, thereby preventing friction and wear and reducing vibration and noise. In addition, accuracy and consistency of assembly may be improved.

The first and second stabilizer bars 100 and 200 may be rotated relative to each other inside the support part 400. For example, the support part 400 may be moved relative to the first stabilizer bar 100 and may be fixed to the second stabilizer bar 200, thereby enabling the first stabilizer bar 100 and the second stabilizer bar 200 to be rotated relative to each other inside the support part 400. For another example, the support part 400 may be fixed to the first stabilizer bar 100 and may be moved relative to the second stabilizer bar 200, thereby enabling the first stabilizer bar 100 and the second stabilizer bar 200 to be rotated relative to each other inside the support part 400.

That is, the support part 400 may be fixed to one of the first and second stabilizer bars 100 and 200 and may be moved relative to the other, thereby enabling the first stabilizer bar 100 and the second stabilizer bar 200 to be rotated relative to each other inside the support part 400.

There are various methods of fixing the support part 400 to the first and second stabilizer bars 100 and 200. Examples of the fixing methods include bolt fastening, pin fixing, snap ring, C-clip, and clamp coupling. For example, the support part 400 has a coupling hole 420 formed therein and configured to allow the support part 400 to be fixed to the first stabilizer bar 100 or the second stabilizer bar 200. A fixing member 430 may be fixedly inserted into the first stabilizer bar 100 or the second stabilizer bar 200 by penetrating the coupling hole 420 in the support part 400. Each of the first and second stabilizer bars 100 and 200 may have a coupling groove 250 formed therein and configured for the fixing member 430 to be coupled thereto. The coupling groove 250 may be formed as a hole penetrating the first and second stabilizer bars 100 and 200 or as a groove that does not penetrate the same. That is, when the fixing member 430 is inserted into the first and second stabilizer bars 100 and 200, the fixing member 430 may be fixed to the first and second stabilizer bars 100 and 200 by penetrating the first and second stabilizer bars 100 and 200 or may be fixedly inserted into the first and second stabilizer bars 100 and 200 without penetrating the first and second stabilizer bars 100 and 200. Whether the fixing member 430 penetrates the first and second stabilizer bars 100 and 200 or is inserted thereinto may be determined by considering the thickness, strength, and the like of the first and second stabilizer bars 100 and 200.

Other examples of fixing the support part 400 to the first and second stabilizer bars 100 and 200 may include various methods such as interference press-fitting, taper coupling, spline coupling, key coupling, welding, brazing, an adhesive, and a groove protrusion insertion structure.

The first and second stabilizer bars 100 and 200 are rotated relative to each other inside the support part 400, and at the same time, the plate spring 300 is also deformed according to the relative rotation. In order to fix the plate spring 300 more reliably, the support part 400 may have an insertion hole 410 formed therein and configured for the plate spring 300 to be inserted thereinto, and the plate spring 300 may be inserted into the insertion hole 410 by penetrating the first stabilizer bar 100 or the second stabilizer bar 200. For example, when the support part 400 is fixed to the first stabilizer bar 100, the plate spring 300 is inserted into the insertion hole 410 by penetrating the first stabilizer bar 100. For another example, when the support part 400 is fixed to the second stabilizer bar 200, the plate spring 300 is inserted into the insertion hole 410 by penetrating the second stabilizer bar 200. Accordingly, the first and second stabilizer bars 100 and 200 are rotated relative to each other inside the support part 400, and only one end of the plate spring 300 is fixed to the support part 400, causing occurrence of deformation according to relative rotation between the first and second stabilizer bars 100 and 200.

When the plate spring 300 penetrates the second stabilizer bar 200 and is inserted into the insertion hole 410, the first stabilizer bar 100 may have a fixing groove 120 formed therein and configured for the plate spring 300 to be caught by the first stabilizer bar 100. As a result, the plate spring 300 may be inserted into both the fixing groove 120 and the insertion hole 410. In addition, the second stabilizer bar 200 facing the first stabilizer bar 100 having the fixing groove 120 formed therein may have a through-hole 220 formed therein at a position corresponding to the insertion hole 410. That is, the plate spring 300 is inserted into all of the insertion hole 410, the through-hole 220, and the fixing groove 120. Accordingly, when the first stabilizer bar 100 and the second stabilizer bar 200 are rotated relative to each other, the plate spring 300 is deformed, and restoring force resulting from deformation of the plate spring 300 provides overall stiffness. The fixing groove 120 is not limited to being formed only in the first stabilizer bar 100. When the plate spring 300 penetrates the first stabilizer bar 100, the fixing groove 120 may be formed in the second stabilizer bar 200. Accordingly, a through-hole may be formed in the first stabilizer bar 100.

The fixing groove 120 is formed inside the first and second stabilizer bars 100 and 200, thereby allowing the plate spring 300 to be fixedly disposed without penetrating the first and second stabilizer bars 100 and 200. In this manner, the plate spring 300 is prevented from penetrating the first and second stabilizer bars 100 and 200 and causing friction with the inner wall of the support part 400. As a result, it is possible not only to smoothly perform rotation of the first and second stabilizer bars 100 and 200 inside the support part 400, but also to prevent reduction in lifespan of the support part 400 or the plate spring 300.

The plate spring 300 may be divided into the first plate member 330 and the second plate member 340 with respect to the hinge part 310, and the length of the first plate member 330 in the width direction WD may be formed to be shorter than the length of the second plate member 340 in the width direction WD. Accordingly, the second plate member 340 may be inserted into the insertion hole 410 in the support part 400, and the first plate member 330 may be inserted into the fixing groove 120.

For example, the plate spring 300 may be formed such that a portion of the plate spring 300, which extends from the hinge part 310 toward the first stabilizer bar 100, is shorter than a portion of the plate spring 300, which extends from the hinge part 310 toward the second stabilizer bar 200. That is, the fixing groove 120 is formed in the first stabilizer bar 100, the short first plate member 330 is inserted into the fixing groove 120, and the long second plate member 340 is inserted into the insertion hole 410 in the support part 400 by penetrating the second stabilizer bar 200.

For another example, the fixing groove 120 is formed in the second stabilizer bar 200, the second plate member 340 is inserted into the insertion hole 410 by penetrating the first stabilizer bar 100, and the first plate member 330 is inserted into the fixing groove 120.

The support part 400 may be formed to be longer than the plate spring 300, and the plate spring 300 may be disposed inside the support part 400. Specifically, the length of the longitudinal direction LD of the support part 400 is formed to be longer than the length of the longitudinal direction LD of the plate spring 300, thereby allowing all portions of the plate spring 300 to be disposed inside the support part 400. Through such a structural configuration, the first and second stabilizer bars 100 and 200 and the plate spring 300 may be disposed symmetrically inside the support part 400 so as to maintain constant stiffness.

The length of the plate spring 300 in the width direction WD may be formed to be shorter than the outer diameter of the support part 400. Accordingly, since the plate spring 300 is completely inserted into the insertion hole 410, the plate spring 300 does not penetrate the outer circumferential surface of the support part 400 such that wear of the plate spring 300 is prevented.

As is apparent from the above description, the present disclosure provides a multi-stiffness suspension apparatus capable of proving multiple stiffnesses so as to secure ride comfort and driving stability in various driving environments.

Furthermore, since the multi-stiffness suspension apparatus has a simple structure, time and cost required for a manufacturing process may be reduced, and performance of a vehicle may be improved through a reduction in the overall weight of the vehicle.

The effects of the present disclosure are not limited to the above-mentioned effects, and other effects not mentioned herein will be clearly understood by those skilled in the art to which the present disclosure pertains from the detailed description of the embodiments.

Although the preferred embodiments of the present disclosure have been disclosed for illustrative purposes, those skilled in the art to which the present disclosure pertains will appreciate that various modifications, additions, and substitutions are possible, without departing from the scope and spirit of the disclosure as disclosed in the accompanying claims.

What is claimed is:

1. A multi-stiffness suspension apparatus, comprising:

a first stabilizer bar connected to a first wheel on a first side of a vehicle;

a second stabilizer bar connected to a second wheel on a second side of the vehicle, wherein:

the second stabilizer bar has a second stabilizer bar end disposed to face a first stabilizer bar end of the first stabilizer bar, and a clearance is formed between the first stabilizer bar end and the second stabilizer bar end in a rotation direction of the first stabilizer bar and the second stabilizer bar; and a plate spring is provided between the first stabilizer bar end and the second stabilizer bar end, wherein:

a side of the plate spring is caught by a first point of the first stabilizer bar end, the first point is spaced apart from the clearance, another side of the plate spring is caught by a second point of the second stabilizer bar end, and the second point is spaced apart from the clearance.

2. The multi-stiffness suspension apparatus of claim 1, wherein:

the first stabilizer bar has a first locking part formed at the first stabilizer bar end, the second stabilizer bar has a second locking part formed at the second stabilizer bar end, the first locking part and the second locking part are disposed to face and overlap each other in a width direction, the side of the plate spring is caught by the first locking part, and the another side of the plate spring is caught by the second locking part.

3. The multi-stiffness suspension apparatus of claim 2, wherein:

the first locking part is formed by cutting a first stabilizer bar part of the first stabilizer bar, and the second locking part is formed by cutting a second stabilizer bar part of the second stabilizer bar.

4. The multi-stiffness suspension apparatus of claim 2, wherein:

a first locking part outer circumference of the first locking part is formed to be equal to or less than ½ of a first stabilizer bar outer circumference of the first stabilizer bar, or a second locking part outer circumference of the second locking part is formed to be equal to or less than ½ of a second stabilizer bar outer circumference of the second stabilizer bar.

5. The multi-stiffness suspension apparatus of claim 2, wherein the first locking part and the second locking part are disposed spaced apart from each other so as to form the clearance between the first locking part and the second locking part.

6. The multi-stiffness suspension apparatus of claim 1, wherein the plate spring extends in a direction crossing the first stabilizer bar end of the first stabilizer bar and the second stabilizer bar end of the second stabilizer bar and is caught by the first stabilizer bar and the second stabilizer bar.

7. The multi-stiffness suspension apparatus of claim 1, wherein:

a hinge part is formed at a portion between the side and the another side of the plate spring, and when the first stabilizer bar and the second stabilizer bar are rotated relative to each other within a range of the clearance:

the plate spring is bent along the hinge part, and an angle formed between a first portion of the plate spring extending from the hinge part toward the first stabilizer bar, and a second portion of the plate spring extending from the hinge part toward the second stabilizer bar, is changed.

8. The multi-stiffness suspension apparatus of claim 1, wherein:

a hinge part is formed at a portion between the side and the another side of the plate spring, and the hinge part is formed on a central axis of the first stabilizer bar or the second stabilizer bar.

9. The multi-stiffness suspension apparatus of claim 1, wherein:

a hinge part is formed at a portion between the side and the another side of the plate spring, and the hinge part is formed by reducing a thickness of the portion of the plate spring.

10. The multi-stiffness suspension apparatus of claim 1, wherein:

a hinge part is formed at a portion between the side and the another side of the plate spring, and the hinge part is a hinge groove formed by being recessed in the portion of the plate spring and extending in a longitudinal direction of the hinge part.

11. The multi-stiffness suspension apparatus of claim 1, wherein:

a hinge part is formed at a portion between the side and the another side of the plate spring, and the plate spring is formed such that a first portion extending from the hinge part toward a first stabilizer bar side is shorter in length than a second portion extending from the hinge part toward a second stabilizer side.

12. The multi-stiffness suspension apparatus of claim 1, wherein:

a hinge part is formed at a portion between the side and the another side of the plate spring, and the plate spring stores elastic force through deformation of the hinge part during rotation of the first stabilizer bar or the second stabilizer bar.

13. A multi-stiffness suspension apparatus, comprising:

a first stabilizer bar connected to a first wheel on a first side of a vehicle; and a second stabilizer bar connected to a second wheel on a second side of the vehicle, wherein:

the second stabilizer bar has a second stabilizer bar end disposed to face a first stabilizer bar end of the first stabilizer bar, a clearance is formed between the first stabilizer bar and the second stabilizer bar in a rotation direction of the first stabilizer bar and the second stabilizer bar, a plate spring is provided between the first stabilizer bar end and the second stabilizer bar end, a side of the plate spring is caught by the first stabilizer bar, another side of the plate spring is caught by the second stabilizer bar, the first stabilizer bar has a first locking part provided at the first stabilizer bar end and formed to partially extend from the first stabilizer bar end, the second stabilizer bar has a second locking part provided at the second stabilizer bar end and formed to partially extend from the second stabilizer bar end, the first locking part and the second locking part are disposed to face and overlap each other in a width direction, and a sum of a first locking part outer circumference of the first locking part and a second locking part outer circumference of the second locking part is formed to be smaller than an outer circumference of the first stabilizer bar or the second stabilizer bar.

14. A multi-stiffness suspension apparatus, comprising:

a first stabilizer bar connected to a first wheel on a first side of a vehicle; and a second stabilizer bar connected to a second wheel on a second side of the vehicle, wherein:

the second stabilizer bar has a second stabilizer bar end disposed to face a first stabilizer bar end of the first stabilizer bar, a clearance is formed between the first stabilizer bar and the second stabilizer bar in a rotation direction of the first stabilizer bar and the second stabilizer bar, a plate spring is provided between the first stabilizer bar end and the second stabilizer bar end, a side of the plate spring is caught by the first stabilizer bar, another side of the plate spring is caught by the second stabilizer bar, and a support part is disposed to surround both the first stabilizer bar end of the first stabilizer bar and the second stabilizer bar end of the second stabilizer bar.

15. The multi-stiffness suspension apparatus of claim 14, wherein the support part is formed to have a support part central axis identical to a central axis of the first stabilizer bar or the second stabilizer bar.

16. The multi-stiffness suspension apparatus of claim 14, wherein the support part is moved relative to the first stabilizer bar and is fixed to the second stabilizer bar, thereby enabling the first stabilizer bar and the second stabilizer bar to be rotated relative to each other inside the support part.

17. The multi-stiffness suspension apparatus of claim 14, wherein:

the support part has an insertion hole formed therein, the insertion hole is configured for the plate spring to be inserted thereinto, and the plate spring is inserted into the insertion hole by penetrating the second stabilizer bar.

18. The multi-stiffness suspension apparatus of claim 14, wherein:

the first stabilizer bar end has a fixing groove formed therein, the fixing groove is configured for the plate spring to be inserted thereinto, and the support part has an insertion hole formed therein, such that the plate spring is inserted into both the fixing groove and the insertion hole.

19. The multi-stiffness suspension apparatus of claim 14, wherein:

the support part is formed to be longer than the plate spring, and the plate spring is disposed inside the support part.

20. The multi-stiffness suspension apparatus of claim 14, wherein a widthwise length of the plate spring is formed to be shorter than an outer diameter of the support part.

* * * * *